Feb. 22, 1927.
W. HILDEBRAND
RAILWAY BRAKE
Filed Feb. 10, 1926
1,618,197
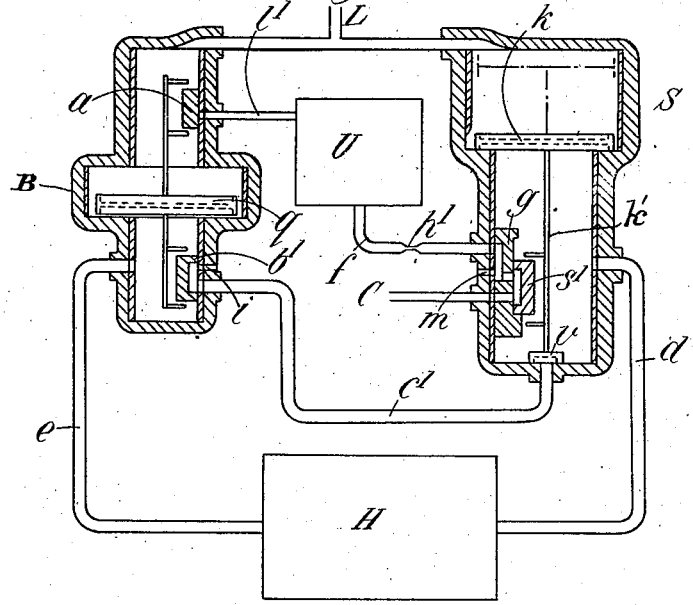

Patented Feb. 22, 1927.

1,618,197

UNITED STATES PATENT OFFICE.

WILHELM HILDEBRAND, OF LICHTERFELDE, BERLIN, GERMANY.

RAILWAY BRAKE.

Application filed February 10, 1926. Serial No. 87,338, and in Germany February 13, 1925.

This invention relates to fluid pressure brake apparatus for railway vehicles of the kind provided with a brake accelerator and a transmission chamber to receive air displaced by the piston of the controlling valve. The invention is intended for use with pneumatic or air pressure brakes.

In known arrangements of pneumatic brakes wherein a braking action begins upon a fall in pressure in the train pipe, and in order to prevent the air displaced by the piston of the controlling valve from being delivered into the train pipe and there accumulating to an extent depending on the number of controlling valves present in the train, a quantity of air corresponding with the displacement volume of the controlling piston is guided by the brake accelerator into a transmission chamber, the difficulty exists that the accelerator does not open the entrance to the transmission chamber until the controlling piston has already forced some air into the train pipe, and consequently an excessive reduction in pressure in the train pipe is necessary to ensure the braking action, especially towards the end of a long train.

According to this invention this difficulty is overcome by arranging the transmission chamber to be connected by a brake accelerator having a piston of short stroke with the train pipe before the movement of the controlling piston begins.

In order that the said invention may be clearly understood and readily carried into effect, the same will be more fully described with reference to the accompanying diagram, wherein Figure 1 represents in section one constructional embodiment of the invention.

Figure 2 represents in section another constructional embodiment.

Figure 3 represents an accelerator with a flap valve instead of a slide valve.

L indicates a pipe communicating with the train pipe, S the casing of the controlling valve, B the casing of the accelerator, U the transmission chamber, H the auxiliary air reservoir, and C the duct leading to the brake cylinder. The controlling valve consists of the casing S, the controlling piston $k$ contained therein and the stepped slide $s^1$ rigidly connected therewith, the said slide $s^1$ being adapted to slide with play or "clearance" upon the main slide $g$. The controlling piston rod is prolonged beyond the stepped slide $s^1$ and carries at its end a small piston $v$ which acts as a closing valve for a connecting pipe between the brake accelerator casing B and the controlling valve casing S and also acts as a counter piston in relation to the controlling piston $k$, the air pressure on the inner surface of the piston $k$ being counteracted to an extent proportionate with the area of the opposing surface of the piston $v$. The brake accelerator B comprises a piston $q$ which is provided, upon the side facing the train pipe, with the slide valve $a$, and at the other side with the slide valve $b^1$ (Figure 1). The valve $a$ thus controls the connection between the train pipe and the transmission chamber and the valve $b^1$ controls the connection between the pipe $c^1$ and the outlet $i$ to the atmosphere and also that between the pipe $c^1$ and the auxiliary air reservoir H.

The auxiliary air reservoir is connected by the pipe $d$ with the controlling slide valve chamber, and by the pipe $e$ with the brake accelerator casing. The outlet of the air from the transmission chamber U is controlled by the main slide $g$, for this purpose the transmission chamber is in communication with the port of the slide through the pipe $f$.

When for the purpose of initiating the brake action a small quantity of air is allowed to escape from the pipe L by operating the driver's valve, the piston $q$ of the brake accelerator B which is under pressure from the reservoir H will at once approach the pipe L, as the slide valves $a$ and $b^1$ moved by it can be made very small, and the faces of these slide valves covering the apertures can be of such small dimensions that the resistances opposing the movement of the piston $q$ are also very small, so that the said piston immediately closes the aperture $i$ communicating with the open air and opens the duct $l^1$ leading to the transmission chamber U, so that a quantity of air corresponding with the volume of the chamber U flows from the train pipe into the said chamber, avoiding interference with the drop in pressure in the train pipe by the small volume of air displaced by the accelerator piston $q$. The controlling piston $k$, on the contrary, does not move at once out of the release position upon the inception of the braking action, because it is held back by resistance of the counter piston $v$, but when the pressure in the pipe L has fallen to a certain extent, the pressure of air from the auxiliary reservoir H upon the back of the larger piston $k$ overcomes the pressure on the smaller piston $v$ and enables the piston $k$ to advance and open the duct C leading to the brake cylinder. In order to prevent the loss of air from the transmission chamber, as long as the slide $g$ has not shut off the de-aerating pipe $f$ from the open air outlet $m$, a contraction $h^1$ is provided in the said pipe $f$ which only permits of a very gradual escape of the air from the chamber U. In order to prevent the retardation of the controlling piston $k$, in relation to the brake accelerator piston $q$, from becoming greater than is necessary for filling the chamber U, the casing of the brake accelerator is connected with the controlling valve casing by means of a pipe $c^1$ which, when a braking operation takes place, allows air from the auxiliary reservoir to pass below the counter piston $v$, so that this small counter piston is soon subjected on both sides to equal pressure conditions and thus loses its retarding influence on the movement of the piston $k$.

The slide valve $g$ controls the duct $f$ leading air from the transmission chamber U, the duct C communicating with the brake cylinder (not shown), and the duct $m$ communicating with the atmosphere. The smaller slide valve $s^1$ on the back of the valve $g$ is intended to act as a graduating valve, and has a certain amount of play or lost motion relatively to the valve $g$, to which it transmits impulses received from the rod $k^1$ of the piston $k$, this action however being deferred so that the movement in each direction of the valve $g$ only begins after the valve $s^1$ has accomplished a part of its stroke. In the position illustrated in the drawings, that is, the release position, the duct $f$ communicates with the duct $m$ through a hollow in the valve $g$, and the duct C also communicates through a hollow in the valve $s^1$ and through the valve $g$ with the said duct $m$. When owing to a reduction of pressure in the train pipe the piston $k$ advances, the valve $s^1$ first shuts off the supply pipe C leading to the brake cylinder from the atmosphere relief duct $m$, then moves the valve $g$ to shut off the duct $m$ from the pipe $f$ and on the further movement of the valve $g$ of the pipe C is opened to the air pressure from the auxiliary reservoir H acting through the interior of the casing S of the control valve.

The same effect can also be realized without employing a retarding piston $v$ when the resistances, which are effective against the movement of the accelerator piston, are substantially smaller than the movement resistances of the controlling piston $k$ with the slides $g$ and $s^1$. This is the case when the controlling member $a$, to be moved by the accelerator piston, is made as small as possible, that is to say when this member has only to control one single connection, namely that between the pipe L and the transmission chamber. Figures 2 and 3 show constructional forms of this type.

In the constructional form according to Figure 2 the connection between the pipe L and the transmission chamber is controlled by the very small slide valve $a$. Both the slide valve friction and the slide valve path are unusually small in the constructional form.

In the constructional form according to Figure 3 a small easily movable flap valve serves to control the said connection.

What I claim and desire to secure by Letters Patent of the United States is:—

1. In a pneumatic brake, a train pipe, an auxiliary air reservoir, a control valve comprising a piston to control the connection of said reservoir with the brake cylinder, an accelerator comprising a piston of shorter stroke and less frictional resistance to movement than said control valve piston, said accelerator piston being exposed to air pressure from said auxiliary reservoir, a transfer chamber, a valve controlling admission of air from said train pipe to said transfer chamber, and means operatively connected with said accelerator piston to open and close the last named valve.

2. In a brake according to claim 1, a piston actuating the controlling valve, said piston being provided with a loading device to retard the commencement of its movement.

3. In a brake according to claim 1, a piston actuating the controlling valve, said piston being provided with a loading device to retard the commencement of its movement, and means whereby the retarding effect of said loading device is suspended by the action of the accelerator upon inception of a braking operation.

4. In a brake according to claim 1, means whereby the connection of the transmission chamber with the open air is effected by the action of the controlling valve.

5. In a brake according to claim 1, an auxiliary air reservoir adapted to constitute the controlling container to actuate the piston of the brake cylinder.

WILHELM HILDEBRAND.